Patented Jan. 19, 1932

1,841,674

UNITED STATES PATENT OFFICE

WILLIAM L. RINTELMAN, OF MILWAUKEE, AND ROBERT J. GOODRICH, OF SOUTH MILWAUKEE, WISCONSIN, ASSIGNORS, BY MESNE ASSIGNMENTS, TO E. I. DU PONT DE NEMOURS & COMPANY, A CORPORATION OF DELAWARE

PROCESS OF PREPARING ORTHO'-ORTHO'-DICARBOXYL-DIPHENYL-DIAMINO ANTHRAQUINONES

No Drawing. Application filed December 11, 1926. Serial No. 154,303.

This invention relates to a process of preparing ortho' - ortho' - dicarboxyl-diphenyl-diamino anthraquinones, having the general formula:

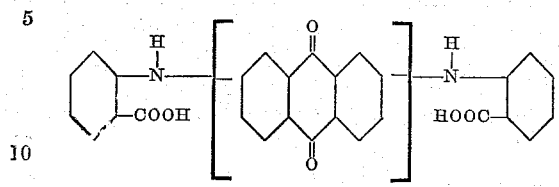

In the previous methods of preparing these bodies, it has been general practice to condense a halogen anthraquinone body with an anthranilic acid body in the presence of a copper catalyst and a relatively high boiling solvent, such as nitro-benzene for instance. An anthranilic acid body is, however, relatively unstable at elevated temperatures in the presence of copper and for this reason the heretofore known methods are not entirely satisfactory. By the term anthranilic acid body, we mean anthranilic acid itself or a body which will readily yield anthranilic acid upon a simple chemical treatment such as acidification, saponification, or hydrolysis. The most common type of such a body is a metallic salt of anthranilic acid.

We have now discovered that if the condensation is carried out in a low boiling alcohol solution under pressure, employing copper or a copper salt as catalyst, a relatively complete reaction is obtained without troublesome side reactions and with a good yield of the product desired.

Other and further advantages of our process include the use of very simple manufacturing apparatus, the carrying out of the reaction at relatively low temperatures, thereby reducing the fire hazard and the elimination of a solvent filtration.

Without limiting our invention to any particular procedure, the following example, in which parts by weight are given, illustrates the application of our invention in the preferred form.

A mixture of 10 parts of 1,5 dichloro anthraquinone, 100 parts of commercial methyl alcohol, 25 parts of the potassium salt of anthranilic acid and 1 part of basic copper acetate is heated under agitation in an autoclave to a temperature of between 135 and 140° C. This temperature is maintained for about 18 hours, during which time the pressure will rise to about 150 pounds and the color of the reaction mass will become purple. At the end of this period, the mass is cooled, the alcohol distilled off, 500 parts of cold water added and hydrochloric acid introduced until the mass is distinctly acid. The mass is now heated to the boiling point, filtered and the filtered product washed free from inorganic salts. On drying the filter cake, ortho'-ortho'-dicarboxyl-diphenyl-1,5 diamino-anthraquinone is obtained in a relatively high degree of purity, suitable for use in the manufacture of dyestuffs without further purification. The chemical formula of the main reaction product is as follows:

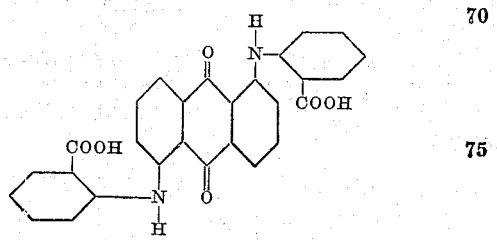

It will be noted in this example that the potassium anthranilate is present in excess of the quantity theoretically necessary for the reaction. The function of the excess of this substance is to take care of the hydrochloric acid liberated during the reaction. In other words, the excess of potassium anthranilate acts as an acid binding acid.

In an entirely analogous manner, other ortho'-ortho'-dicarboxyl-diphenyl-diamino anthraquinones may be obtained. It will also be understood that other low boiling alcohols, that is, alcohols boiling below the boiling point of water, may be substituted for methyl alcohol, as for instance, ethyl alcohol or iso-propyl alcohol.

We are aware that numerous details of the process may be varied through a wide range without departing from the spirit of this invention, and we do not desire limiting the patent granted hereon otherwise than as necessitated by the prior art.

We claim as our invention:

1. The process of preparing on ortho'-ortho'-dicarboxyl-diphenyl diamino anthraquinone, having the general formula:

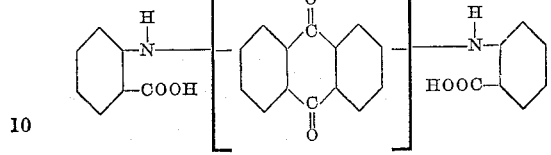

which comprises heating a dihalogen anthraquinone body with an anthranilic acid body in a low boiling alcohol under pressure in the presence of a copper catalyst at a temperature between 135 and 140° C. until the color of the reaction mass becomes purple, distilling off the alcohol, diluting, acidifying, heating to the boiling point and filtering off the insoluble ortho'-ortho'-dicarboxyl-diphenyl diamino anthraquinone.

2. The process of preparing ortho'-ortho'-dicarboxyl-diphenyl-diamino-anthraquinones of the general formula:

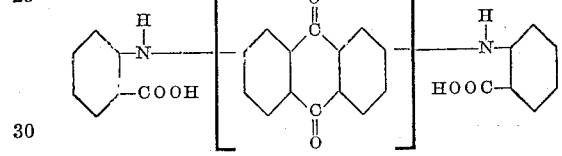

which comprises heating a dihalogen anthraquinone body with an anthranilic acid body in a low boiling alcohol under pressure at a temperature of approximately 135° to 140° C. in the presence of a catalyst.

3. The process of preparing ortho'-ortho'-dicarboxyl-diphenyl 1:5 diamino anthraquinone, having the following formula:

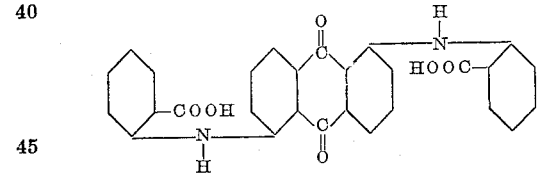

which comprises heating 1:5 dichloro anthraquinone with an anthranilic acid body in a low boiling alcohol under pressure at a temperature of approximately 135 to 140° C. in the presence of a catalyst.

4. The process of preparing ortho'-ortho'-dicarboxyl-diphenyl 1:5 diamino anthraquinone, having the following formula:

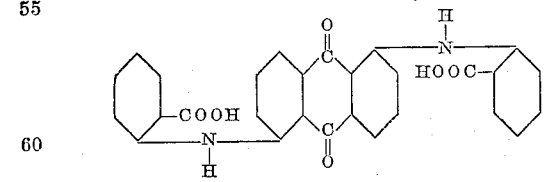

which comprises heating 1:5 dichloro anthraquinone with an alkali salt of anthranilic acid in a low boiling alcohol under pressure in the presence of a copper catalyst at a temperature of approximately 140° C., cooling the reaction mass, adding water thereto, acidifying, boiling and filtering out the ortho'-ortho'-dicarboxyl-diphenyl 1:5 diamino anthraquinone.

5. The process of preparing ortho'-ortho'-dicarboxyl-diphenyl diamino anthraquinones having the following general formula:

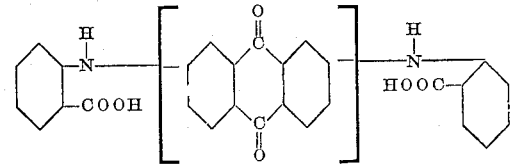

which comprises heating, under pressure, a dihalogen anthraquinone body with an anthranilic acid body in the presence of an alcohol having a lower boiling point than water and in the presence of a catalyst.

6. The process of preparing ortho'-ortho'-dicarboxyl-diphenyl 1:5 diamino anthraquinone having the following general formula:

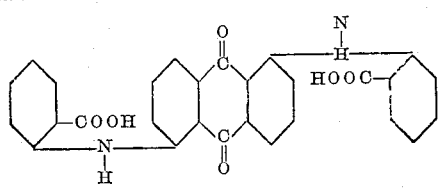

which comprises heating, under pressure, a 1:5 dichloro anthraquinone body with an anthranilic acid body in the presence of an alcohol having a lower boiling point than water and in the presence of a catalyst.

7. The process of preparing ortho'-ortho'-dicarboxyl-diphenyl-1,5-diamino-anthraquinones having the following formula:

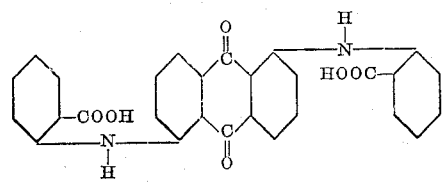

which comprises heating 1,5-dichloro-anthraquinone with an excess of an anthranilic acid body in alcohol under pressure and in the presence of a catalyst, the excess of said anthranilic acid body acting as an acid binding agent.

8. The process of preparing ortho'-ortho'-dicarboxyl-diphenyl-1,5-diamino-anthraquinones having the following formula:

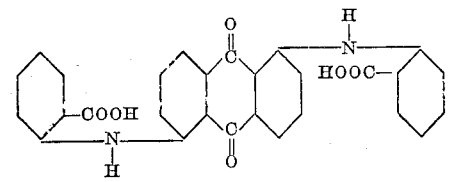

which comprises heating 1,5-dichloro-anthraquinone with an excess of an anthranilic acid body in a low boiling alcohol under pressure and in the presence of a catalyst, the excess of said anthranilic acid body acting as an acid binding agent.

9. The process of preparing ortho'-ortho'-dicarboxyl - diphenyl - 1,5 - diamino - anthraquinones having the following formula:

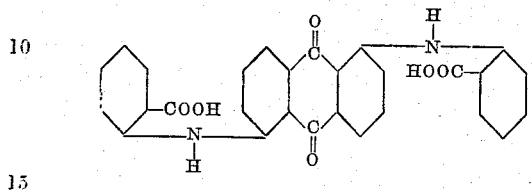

which comprises heating 1,5-dichloro-anthraquinone with an excess of an anthranilic acid body in a low boiling alcohol under pressure and at a temperature of approximately 135 to 140° C. in the presence of a catalyst, the excess of said anthranilic acid body functioning as an acid binding agent.

10. The process of preparing ortho'-ortho'-dicarboxyl - diphenyl - 1,5 - diamino - anthraquinones having the following formula:

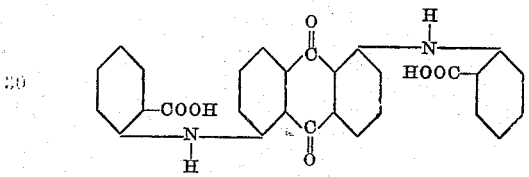

which comprise heating 1,5-dichloro-anthraquinone with an excess of potassium anthranilate in a low boiling alcohol under pressure and at a temperature of approximately 135 to 140° C. in the presence of a catalyst, cooling the reaction mass, adding water thereto, acidifying, boiling and filtering out the ortho'-ortho'-dicarboxyl - diphenyl - 1,5 - diamino anthraquinone.

11. The process of preparing an alpha ortho'-ortho'-dicarboxyl-diphenyl diamino anthraquinone, having the general formula:

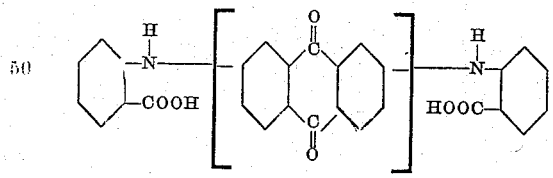

which comprises heating an alpha dihalogen antraquinone boxy with an anthranilic acid body in a low boiling alcohol under pressure in the presence of a copper catalyst at a temperature between 135° and 140° C., until the color of the reaction mass becomes purple, distilling off the alcohol, diluting, acidifying, heating to the boiling point and filtering off the insoluble ortho'-ortho'-dicarboxyl-diphenyl diamino anthraquinone.

12. The process of preparing alpha ortho'-ortho'-dicarboxyl-diphenyl - diamino anthraquinones of the general formula:

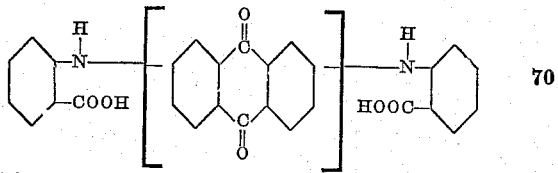

which comprises heating an alpha dihalogen anthraquinone body with an anthranilic acid body in a low boiling alcohol under pressure at a temperature of approximately 135° to 140° C. in the presence of a catalyst.

In testimony whereof we have hereunto subscribed our names.

WILLIAM L. RINTELMAN.
ROBERT J. GOODRICH.